US011283587B2

(12) United States Patent
Wang (10) Patent No.: US 11,283,587 B2
(45) Date of Patent: Mar. 22, 2022

(54) DATA EXTRACTION METHOD FOR TRANSMISSION SIGNAL, DEVICE AND COMPUTER READABLE STORAGE MEDIUM (71) Applicants: HKC Corporation Limited, Guangdong (CN); Chongqing HKC Optoelectronics Technology Co., Ltd., Chongqing (CN)

(72) Inventor: Mingliang Wang, Guangdong (CN)

(73) Assignees: HKC Corporation, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 17/035,669

(22) Filed: Sep. 28, 2020

(65) Prior Publication Data
US 2021/0014037 A1    Jan. 14, 2021

Related U.S. Application Data (63) Continuation of application No. PCT/CN2018/119170, filed on Dec. 4, 2018.

(30) Foreign Application Priority Data

Oct. 8, 2018   (CN) .......................... 201811171274.1

(51) Int. Cl.
H04L 7/08      (2006.01)
H04L 7/00      (2006.01)

(52) U.S. Cl.
CPC .................. H04L 7/0016 (2013.01)

(58) Field of Classification Search
CPC ........................ H04L 7/0079; H04L 7/0087
See application file for complete search history.

(56) References Cited

U.S. PATENT DOCUMENTS 8,878,792 B2 * 11/2014 Lim ..................... H03L 7/0816
                                                    345/173
9,673,962 B1 *  6/2017 Khan .................... H04L 7/0331
(Continued)

FOREIGN PATENT DOCUMENTS

CN       1573675 A     2/2005
CN     101039442 A     9/2007
(Continued)

OTHER PUBLICATIONS

1st Office Action of counterpart Chinese Patent Application No. 201811171274.1 dated Mar. 18, 2020.
(Continued)

Primary Examiner — Qutbuddin Ghulamali (57) ABSTRACT

The application provides a data extraction method for transmission signal, the data extraction method for transmission signal includes: upon receiving a transmission signal, parsing a first clock signal corresponding to the transmission signal to obtain a signal frequency; generating a second clock signal of same frequency according to the signal frequency; and extracting a data of the transmission signal according to the second clock signal. The present application aims to solve the problem of inaccurate data extraction of the transmission signal and improve the accuracy of data extraction of the transmission signal. The present application also provides a data extraction device for transmission signal and a computer readable storage medium.

16 Claims, 7 Drawing Sheets (56) References Cited

U.S. PATENT DOCUMENTS

2009/0135975 A1* 5/2009 Yi .................. H04L 7/0331
                                                                     375/360
2015/0139252 A1    5/2015  Nguyen et al.
2020/0319664 A1* 10/2020 Jin .................. H04L 7/0087

FOREIGN PATENT DOCUMENTS

| CN | 101923859 A | 12/2010 |
|---|---|---|
| CN | 102177656 A | 9/2011 |
| CN | 102655450 A | 9/2012 |
| CN | 104461972 A | 3/2015 |
| CN | 104516397 A | 4/2015 |
| CN | 107491802 A | 12/2017 |
| CN | 107800429 A | 3/2018 |

OTHER PUBLICATIONS

International Search Report of PCT Patent Application No. PCT/CN2018/119170 dated Jul. 5, 2019.

\* cited by examiner

Fig. 5 upon receiving a transmission signal, parsing a first clock signal corresponding to the transmission signal to obtain a signal frequency — S10 parsing a first clock signal corresponding to the transmission signal to obtain a time interval between two adjacent zero-volt time points in the first clock signal — S40 calculating the signal frequency according to the time interval — S41

DATA EXTRACTION METHOD FOR TRANSMISSION SIGNAL, DEVICE AND COMPUTER READABLE STORAGE MEDIUM

CROSS-REFERENCE OF RELATED APPLICATIONS

The present application is a continuation application of International Application No. PCT/CN2018/119170, filed on Dec. 4, 2018, which claims the benefit of Chinese patent application No. 201811171274.1 titled "DATA EXTRACTION METHOD FOR TRANSMISSION SIGNAL, DEVICE AND STORAGE MEDIUM", filed on Oct. 8, 2018, the entire contents of which is incorporated herein by reference in its entirety.

FIELD OF THE DISCLOSURE

The present application relates to the field of communications technologies, in particular, to a data extraction method for transmission signal, a data extraction device for transmission signal and a computer readable storage medium.

BACKGROUND OF THE DISCLOSURE

In the field of communication technology, generally, related data of the transmission signal is extracted according to a clock signal corresponding to the received transmission signal. However, in the actual situation, due to the inconsistency of the characteristic impedance of the transmission trace, the signal will encounter a reflection phenomenon during the transmission process, and the reflected signal is superimposed with the initial signal, so that the waveform of the actual clock signal will appear uneven. At this time, the related data of the transmission signal is directly extracted according to the clock signal, which may result in the extraction of the erroneous data.

SUMMARY OF THE DISCLOSURE

The main purpose of the present application is to provide a data extraction method and device for transmission signal and a computer readable storage medium, which may avoid data extracted from an inaccurate transmission signal and improve the accuracy of data extraction of the transmission signal.

To achieve the above purpose, the present application provides a data extraction method for transmission signal, the data extraction method for transmission signal comprising the steps of:

upon receiving a transmission signal, parsing a first clock signal corresponding to the transmission signal to obtain a signal frequency;

generating a second clock signal of same frequency according to the signal frequency; and extracting a data of the transmission signal according to the second clock signal.

Optionally, the step of parsing a first clock signal corresponding to the transmission signal to obtain a signal frequency includes:

parsing the first clock signal corresponding to the transmission signal to obtain a time interval between two adjacent zero-volt time points in the first clock signal; and calculating the signal frequency according to the time interval.

Optionally, the step of calculating the signal frequency according to the time interval includes:

calculating a signal period of the first clock signal according to the time interval; and calculating the signal frequency according to the signal period.

Optionally, before the step of calculating the signal frequency according to the time interval, the method further comprises:

treating time intervals with equal durations as a same time interval, and accumulating a number of occurrences of the same time interval; and treating a time interval whose number of occurrences meets a predetermined condition as the time interval for calculating the signal frequency.

Optionally, the step of extracting a data of the transmission signal according to the second clock signal includes:

upon the second clock signal being at a rising edge or a falling edge, obtaining a time point of the transmission signal corresponding to the rising edge or the falling edge; and extracting the data of the transmission signal according to the time point.

Optionally, the data extraction method for transmission signal further comprises the steps of:

upon receiving the transmission signal, parsing the first clock signal to obtain a zero-volt time point of the first clock signal;

obtaining a predetermined duration, and generating a data extraction period centered at the zero-volt time point according to the zero-volt time point and the predetermined duration; and extracting the data of the transmission signal according to the data extraction period.

Optionally, before the step of obtaining a predetermined duration, and generating a data extraction period centered at the zero-volt time point according to the zero-volt time point and the predetermined duration, the method further comprises:

obtaining a rising edge and a falling edge of the first clock signal;

obtaining a waveform outlier of the first clock signal according to the rising edge, the falling edge, and the zero-volt time point; and determining the predetermined duration according to the waveform outlier.

Optionally, the step of extracting the data of the transmission signal according to the data extraction period includes:

obtaining a signal period of the transmission signal corresponding to the data extraction period, and extracting the data of the transmission signal during the signal period.

To achieve the above purpose, the present application further provides a data extraction device for transmission signal, the data extraction device for transmission signal comprising:

the data extraction device for transmission signal comprises a memory, a processor, and a data extraction program for transmission signal stored in the memory and executable by the processor; the data extraction program for transmission signal is implemented by the processor to implement the steps of the above data extraction method for transmission signal.

To achieve the above purpose, the present application further provides a computer readable storage medium, wherein the computer readable storage medium is stored with a data extraction program; the data extraction program for transmission signal is executable by a processor to implement the steps of the above data extraction method for transmission signal.

The data extraction method for transmission signal, the data extraction device for transmission signal, and the computer readable storage medium are provided by the present application, comprising: upon receiving a transmission signal, parsing a first clock signal corresponding to the transmission signal to obtain a signal frequency; generating a second clock signal of same frequency according to the signal frequency; extracting a data of the transmission signal according to the second clock signal. Thus, by generating a clock signal with a normal waveform, that is, a second clock signal, and extracting a data of the transmission signal according to the clock signal, the problem of inaccurate data extraction of the transmission signal is solved and the accuracy of data extraction of the transmission signal is improved.

The object realization, function characteristics and advantages of this application will be further described in reference to embodiments and accompanying drawings.

DETAILED DESCRIPTION OF THE EMBODIMENTS

It should be understood that the specific embodiments described herein are only for illustrating but not for limiting the present application.

The present application provides a data extraction method for transmission signal, which, by generating a clock signal with a normal waveform, that is, a second clock signal, and extracting a data of the transmission signal according to the clock signal, solves the problem of inaccurate data extraction of the transmission signal and improves the accuracy of data extraction of the transmission signal.

Figure 1:
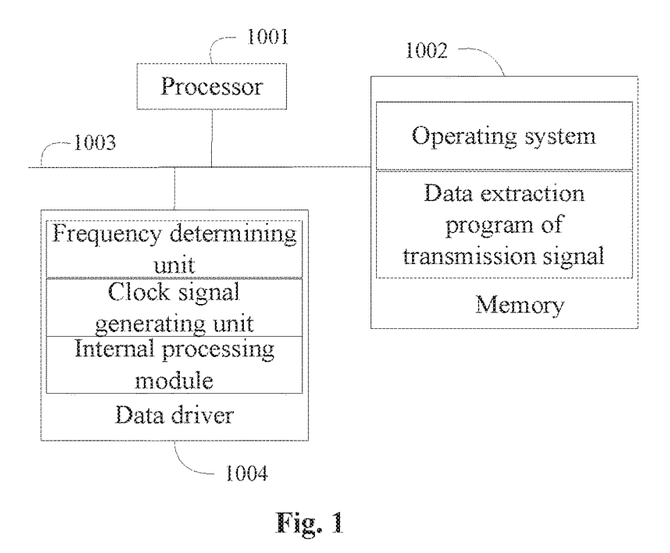
FIG. 1 is a structural view of a hardware operating environment of a terminal according to an embodiment of the present application.

As shown in FIG. 1, FIG. 1 is a structural view of a hardware operating environment of a terminal according to an embodiment of the present application;

The terminal in the embodiment of the present application may be a data extraction device for transmission signal, or may be a television set or a computer.

As shown in FIG. 1, the terminal may comprise a processor 1001 such as a central processing unit (CPU), a memory 1002, a communication bus 1003, and a data driver 1004. Among them, the communication bus 1003 is configured to realize connection and communication between the terminal and various components. The memory 1002 may be a high-speed RAM memory, and can also be a non-volatile memory, such as a magnetic disk memory. The memory 1002, alternatively, may also be a storage device independent from the aforementioned processor 1001. The data driver 1004 performs processing of transmission signal, and may include at least one of a frequency determining member, a clock signal generating member, and an internal processing circuit.

A person skilled in the art may understand that the terminal structure shown in FIG. 1 does not limit the terminal in the embodiment of the present application, and the terminal may comprise more or less components as shown in the figure, or have combinations of certain components or different arrangement of components.

As shown in FIG. 1, the memory 1002, as a computer storage medium, may comprise a data extraction program for transmission signal.

In the terminal shown in FIG. 1, the processor 1001 may be configured to invoke a data extraction program for transmission signal stored in the memory 1002, and perform the following operations:

upon receiving a transmission signal, parsing a first clock signal corresponding to the transmission signal to obtain a signal frequency;

generating a second clock signal of same frequency according to the signal frequency; and extracting a data of the transmission signal according to the second clock signal.

Optionally, the processor 1001 may invoke a data extraction program for transmission signal stored in the memory 1002, and perform the following operations:

parsing a first clock signal corresponding to the transmission signal to obtain a time interval between two adjacent zero-volt time points in the first clock signal; and calculating the signal frequency according to the time interval.

Optionally, the processor 1001 may invoke a data extraction program for transmission signal stored in the memory 1002, and perform the following operations:

treating time intervals with equal durations as the same time interval, and accumulating the number of occurrences of the same time interval; and treating a time interval in which the number of occurrences meets a predetermined condition as a time interval for calculating the signal frequency.

Optionally, the processor 1001 may invoke a data extraction program for transmission signal stored in the memory 1002, and perform the following operations:

calculating a signal period of the first clock signal according to the time interval; and calculating the signal frequency according to the signal period.

Optionally, the processor 1001 may invoke a data extraction program for transmission signal stored in the memory 1002, and perform the following operations:

upon the second clock signal being at a rising edge or a falling edge, obtaining a time point of the transmission signal corresponding to the rising edge or the falling edge; and extracting the data of the transmission signal according to the time point.

Optionally, the processor 1001 may invoke a data extraction program for transmission signal stored in the memory 1002, and perform the following operations:

upon receiving a transmission signal, parsing the first clock signal to obtain a zero-volt time point of the first clock signal;

obtaining a predetermined duration, and generating a data extraction period centered at the zero-volt time point according to the zero-volt time point and the predetermined duration; and extracting the data of the transmission signal according to the data extraction period.

Optionally, the processor 1001 may invoke a data extraction program for transmission signal stored in the memory 1002, and perform the following operations:

obtaining a rising edge and a falling edge of the first clock signal;

obtaining a waveform outlier of the first clock signal according to the rising edge, the falling edge, and the zero-volt time point; and determining the predetermined duration according to the waveform outlier.

Optionally, the processor 1001 may invoke a data extraction program for transmission signal stored in the memory 1002, and perform the following operations:

obtaining a signal period of the transmission signal corresponding to the data extraction period, and extracting the data of the transmission signal during the signal period.

Figure 2:
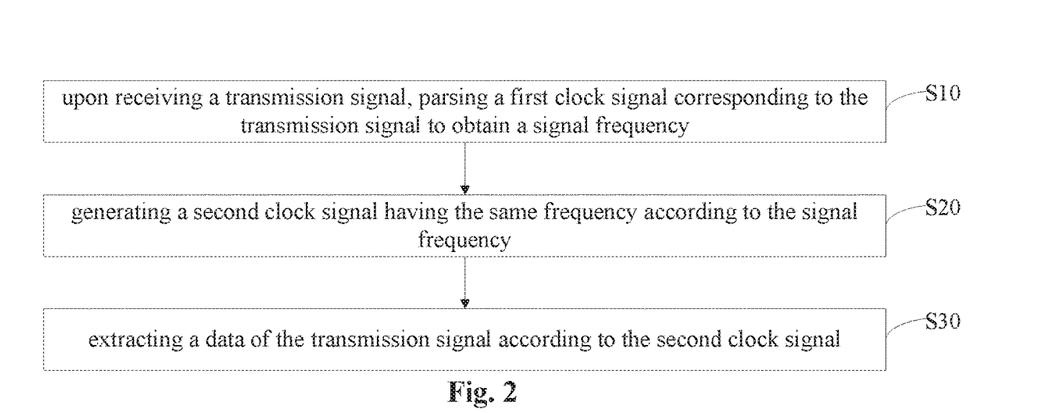
FIG. 2 is a flow chart of an embodiment of a data extraction method for transmission signal according to the present application.

Referring to FIG. 2, in an embodiment, the data extraction method for transmission signal further comprises:

step S10, upon receiving a transmission signal, parsing a first clock signal corresponding to the transmission signal to obtain a signal frequency.

step S20, generating a second clock signal of same frequency according to the signal frequency.

In today's life, as communication technologies become more developed, more and more data is transmitted through transmission signals. Take the technical field of digital TV as an example, as LCD TVs become larger and larger, the resolution is getting higher and higher, and the amount of data that requires to be transmitted is increasing. Therefore, differential signals are widely used as a high-speed transmission protocol in transmission signals. However, during the transmission of the signal in the actual transmission process, due to the inconsistency of the characteristic impedance of the transmission trace, the transmission signal will encounter a reflection phenomenon during the transmission process, and the reflected transmission signal is superimposed with the initial clock signal, so that the waveform of the obtained actual clock signal will appear uneven. At this time, if the data of the transmission signal is extracted directly from the clock signal, that is, the first clock signal, the erroneous data may be extracted.

Figure 3:
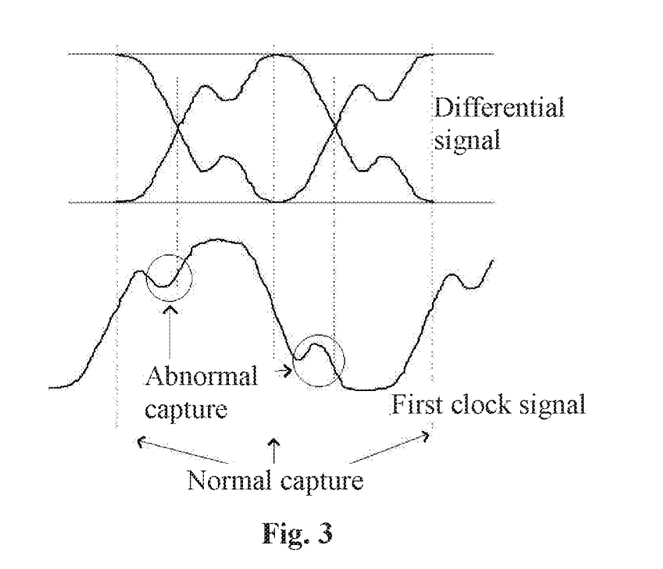
FIG. 3 is an example view of an embodiment of a data extraction method for transmission signal according to the present application.

Referring to FIG. 3, taking a differential signal that is a transmission signal as an example, since the differential signal reflection will bring about a change in the waveform of the clock signal, when the reflected differential signal is superimposed with the initial clock signal sent by the clock source to obtain the first clock signal, if the data of the differential signal is extracted according to the rising edge or the falling edge of the first clock signal, the detection error for the rising edge or the falling edge of the first clock signal may be caused by the receiving end when the waveform of the first clock signal due to signal reflection is concave or convex greatly, and when the data of the differential signal is extracted at the wrong rising edge or falling edge, the receiving end may receive the wrong data, resulting in an inaccurate data extraction of the transmission signal, and abnormal data display or appearance of noise points. It should be noted that the initial clock signal may also be sent by the transmitting end of the transmission signal.

It should be noted that the first clock signal may be a signal obtained by superimposing an initial clock signal sent by a clock source and a signal of the transmission signal, and may also be obtained by superimposing the initial clock signal sent by the transmitting end of the transmission signal and the signal of the transmission signal.

In order to solve the problem of inaccurate data extraction of the transmission signal, the solution of the present application is: obtaining a signal frequency of the first clock signal according to parsing a first clock signal corresponding to the transmission signal, and generating, according to the signal frequency, a second clock signal having a frequency equal to the first clock signal but having a normal waveform, and extracting a data of the transmission signal according to the second clock signal. Among them, the first clock signal is obtained by superimposing the transmission signal and a clock signal sent by a clock source.

Figure 4:
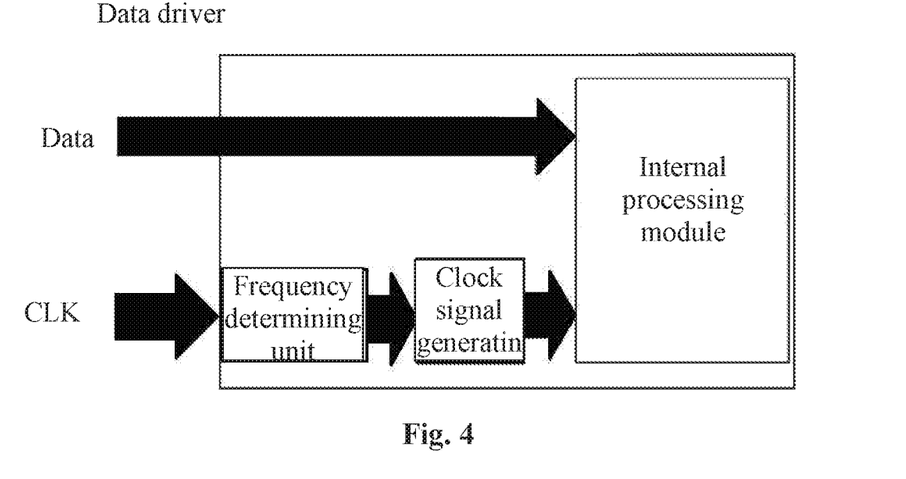
FIG. 4 is a circuit view of a data driver of an embodiment of a data extraction method for transmission signal according to the present application.

Specifically, upon receiving a transmission signal, a first clock signal corresponding to the transmission signal is parsed to obtain a signal frequency, and a second clock signal of same frequency is generated according to the signal frequency. Referring to FIG. 4, a frequency determining member and a clock signal generating member may be disposed on a clock signal (CLK) branch inside the data driver (Data Driver); before the terminal controls the internal processing circuit of the data driver to extract the data –Data of the transmission signal, when the first clock signal –CLK passes through the frequency determining member, the signal frequency of the first clock signal is first parsed, and the second clock signal of same frequency as the signal is generated by the clock signal generating member.

It should be noted that the step of parsing a first clock signal corresponding to the transmission signal to obtain a signal frequency may be performed by parsing a first clock signal corresponding to the transmission signal to obtain a time interval between two adjacent zero-volt time points in the first clock signal; since the time interval between two adjacent zero-volt time points is equal to half a clock cycle, a signal period of the first clock signal may be calculated according to the time interval, and then, according to the signal period, the signal frequency may be calculated by using the signal period and the signal frequency as a reciprocal relationship.

step S30, extracting a data of the transmission signal according to the second clock signal.

Figure 5:
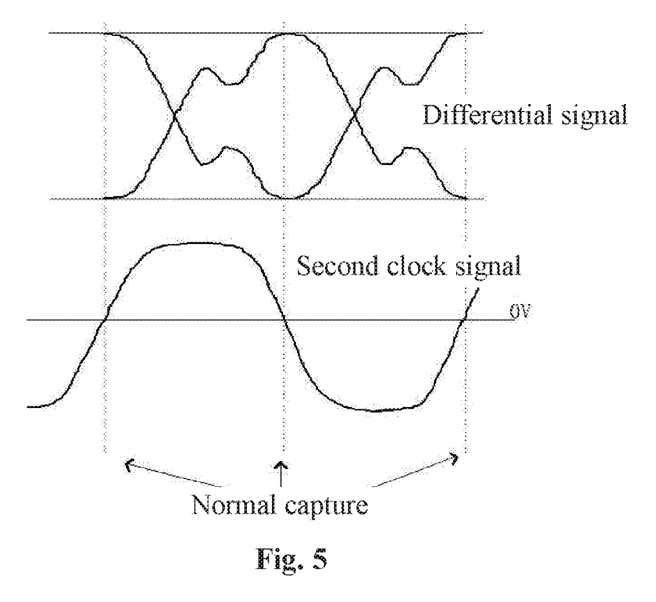
FIG. 5 is an example view of another embodiment of a data extraction method for transmission signal according to the present application.

In the present embodiment, since the reflection of the transmission signal does not interfere during the generation of the second clock signal, the waveform of the second clock signal is a normal waveform, and the second clock signal is generated according to the signal frequency of the first clock signal, and is equal to the frequency of the first clock signal; thus, the data of the transmission signal may be extracted according to the second clock signal. Referring to FIG. 5, taking the transmitted signal that is a differential signal as an example, the data of the transmission signal is extracted according to the second clock signal, and upon the second clock signal being at a rising edge or a falling edge, a time point of the transmission signal corresponding to the rising edge or the falling edge is obtained, and then, the data of the transmission signal is exacted according to the time point.

In an embodiment, upon receiving a transmission signal, a first clock signal corresponding to the transmission signal is parsed to obtain a signal frequency; a second clock signal of same frequency is generated according to the signal frequency; a data of the transmission signal is extracted according to the second clock signal. Thus, by generating a second clock signal of same frequency as the first clock signal but having a normal signal waveform, and extracting the data of the transmission signal according to the second clock signal, the problem of inaccurate data extraction of the transmission signal is solved and the accuracy of data extraction of the transmission signal is improved.

Figure 6:
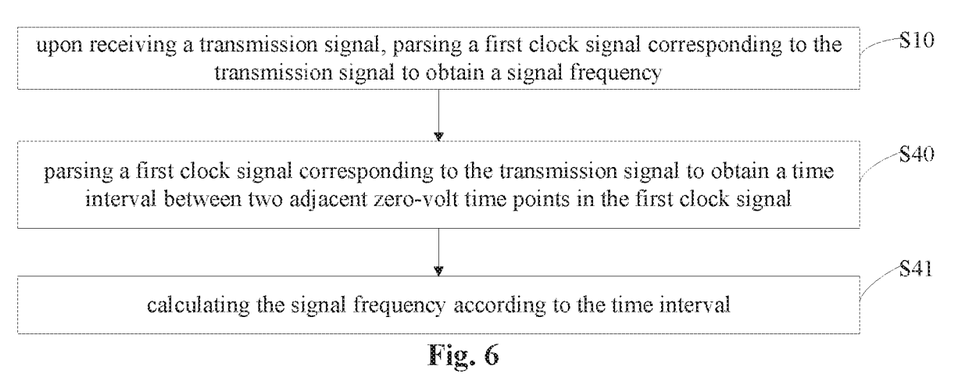
FIG. 6 is a flow chart of another embodiment of a data extraction method for transmission signal according to the present application.

In an embodiment, as shown in FIG. 6, based on the above embodiments of FIGS. 2 to 5, the step of parsing a first clock signal corresponding to the transmission signal to obtain a signal frequency includes:

step S40, parsing a first clock signal corresponding to the transmission signal to obtain a time interval between two adjacent zero-volt time points in the first clock signal.

step S41, calculating the signal frequency according to the time interval.

In the present embodiment, a first clock signal corresponding to the transmission signal is parsed to obtain a zero-volt time point of the first clock signal. Since the time interval between two adjacent zero-volt time points is equal to half a clock cycle, after calculating the time interval according to the adjacent zero-volt time point, a signal period of the first clock signal may be calculated according to the time interval, and then, according to the signal period, the signal frequency may be calculated by using the signal period and the signal frequency as a reciprocal relationship.

It should be noted that since the first clock signal is a signal obtained by superimposing an initial clock signal sent by a clock source and a signal of the transmission signal, the signal frequency of the first clock signal may also be obtained by parsing the frequency of the initial clock signal sent by the clock source.

In an embodiment, a first clock signal corresponding to the transmission signal is parsed to obtain a time interval between two adjacent zero-volt time points in the first clock signal; the signal frequency is calculated according to the time interval. Thus, by parsing the time interval between two adjacent zero-volt time points in the first clock signal, the signal frequency of the first clock signal may be obtained by parsing.

Figure 7:
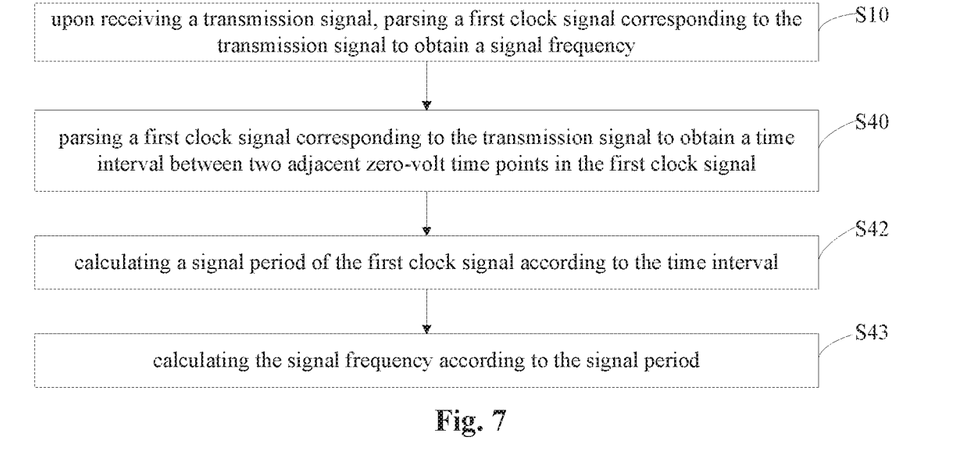
FIG. 7 is a flow chart of a still another embodiment of a data extraction method for transmission signal according to the present application.

In an embodiment, as shown in FIG. 7, based on the above embodiments of FIGS. 2 to 6, the step of calculating the signal frequency according to the time interval includes:

step S42, calculating a signal period of the first clock signal according to the time interval.

step S43, calculating the signal frequency according to the signal period.

In the present embodiment, since the time interval between two adjacent zero-volt time points is equal to half a clock cycle, a signal period of the first clock signal may be calculated according to the time interval, and then, according to the signal period, the signal frequency may be calculated by using the signal period and the signal frequency as a reciprocal relationship.

In an embodiment, a signal period of the first clock signal is calculated according to the time interval; the signal frequency is calculated according to the signal period. Thus, calculating the signal frequency according to the time interval is implemented.

Figure 8:
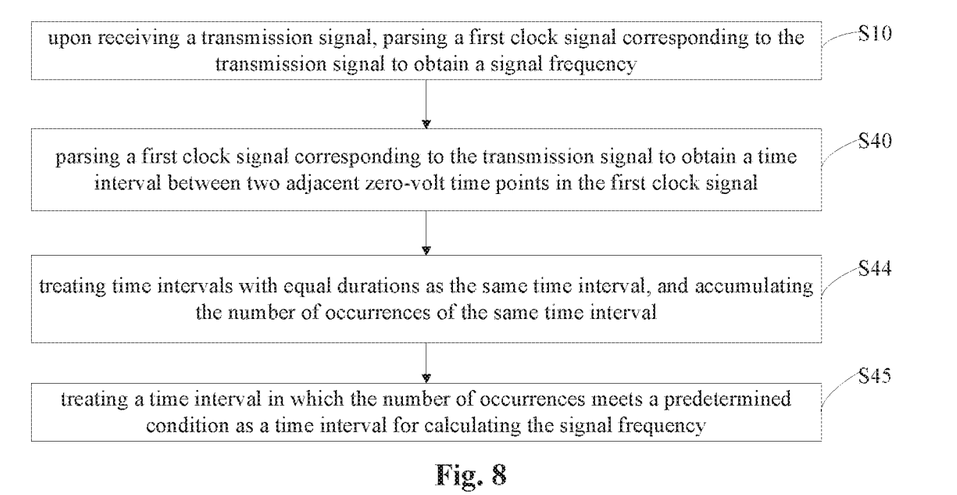
FIG. 8 is a flow chart of a still another embodiment of a data extraction method for transmission signal according to the present application.

In an embodiment, as shown in FIG. 8, based on the above embodiments of FIGS. 2 to 7, before the step of calculating the signal frequency according to the time interval, the method further comprises:

step S44, treating time intervals with equal durations as the same time interval, and accumulating the number of occurrences of the same time interval.

step S45, treating a time interval in which the number of occurrences meets a predetermined condition as a time interval for calculating the signal frequency.

In the present embodiment, before the step of calculating the signal frequency according to the time interval, the time intervals of the two adjacent zero-volt time points are first screened. It should be noted that, in an ideal state, the durations of time intervals of adjacent zero-volt time points are equal. In order to avoid taking the time interval calculated from the zero-volt time point due to signal superposition as the time interval for calculating the signal frequency, first the time intervals are screened or the time intervals are verified.

Specifically, all time intervals within a predetermined time are obtained, time intervals with equal durations are treated as the same time interval, and the number of occurrences of the same time interval is accumulated. Treating a time interval in which the number of occurrences meets a predetermined condition as a time interval for calculating the signal frequency may be performed by treating a time interval in which the number of occurrences is the greatest as a time interval for calculating a signal frequency. It should be noted that if there is no zero-volt time point due to signal superposition, the duration of each of the time intervals is equal. Therefore, there is only one time interval of the same time. Of course, the time interval may also be directly configured to calculate the signal frequency.

In an embodiment, time intervals with equal durations are treated as the same time interval, and the number of occurrences of the same time interval is accumulated; and a time interval in which the number of occurrences meets a predetermined condition is treated as a time interval for calculating the signal frequency. In this way, the accuracy of the signal frequency calculation is improved.

Figure 9:
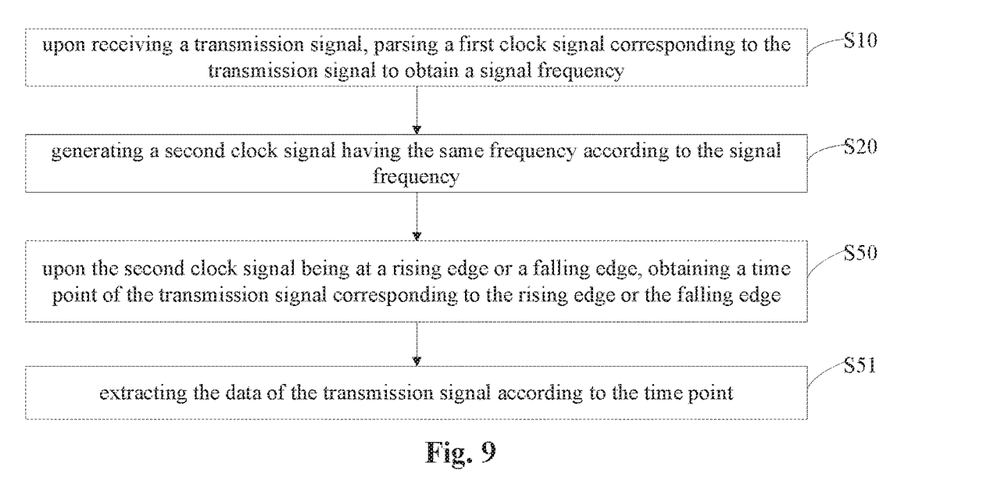
FIG. 9 is a flow chart of a still another embodiment of a data extraction method for transmission signal according to the present application.

In an embodiment, as shown in FIG. 9, based on the above embodiments of FIGS. 2 to 8, the step of extracting a data of the transmission signal according to the second clock signal includes:

step S50, upon the second clock signal being at a rising edge or a falling edge, obtaining a time point of the transmission signal corresponding to the rising edge or the falling edge.

step S51, extracting the data of the transmission signal according to the time point.

In the present embodiment, since the reflection of the transmission signal does not interfere during the generation of the second clock signal, the waveform of the second clock signal is a normal waveform, and the second clock signal is generated according to the signal frequency of the first clock signal, and is equal to the frequency of the first clock signal; thus, the data of the transmission signal may be extracted according to the second clock signal.

A rising edge and/or a falling edge of the second clock signal is obtained after generating a second clock signal of same frequency as the first clock signal but having a normal waveform according to the signal frequency, and upon the second clock signal being at a rising edge or a falling edge, a time point of the transmission signal corresponding to the rising edge or the falling edge is obtained, and then, the data of the transmission signal is exacted according to the time point.

In an embodiment, upon the second clock signal being at a rising edge or a falling edge, a time point of the transmission signal corresponding to the rising edge or the falling edge is obtained; the data of the transmission signal is exacted according to the time point. Thus, by extracting the data of the transmission signal according to the second clock signal of same frequency as the first clock signal but having a normal signal waveform, the accuracy of data extraction of the transmission signal is improved.

Figure 10:
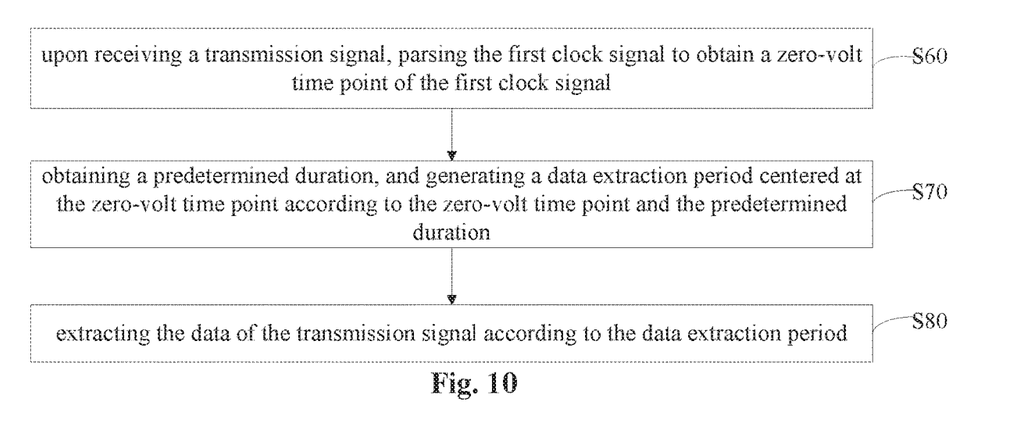
FIG. 10 is a flow chart of a still another embodiment of a data extraction method for transmission signal according to the present application.

In an embodiment, as shown in FIG. 10, based on the above embodiments of FIGS. 2 to 9, the data extraction method for transmission signal further comprises:

step S60, upon receiving a transmission signal, parsing the first clock signal to obtain a zero-volt time point of the first clock signal.

step S70, obtaining a predetermined duration, and generating a data extraction period centered at the zero-volt time point according to the zero-volt time point and the predetermined duration.

step S80, extracting the data of the transmission signal according to the data extraction period.

Figure 11:
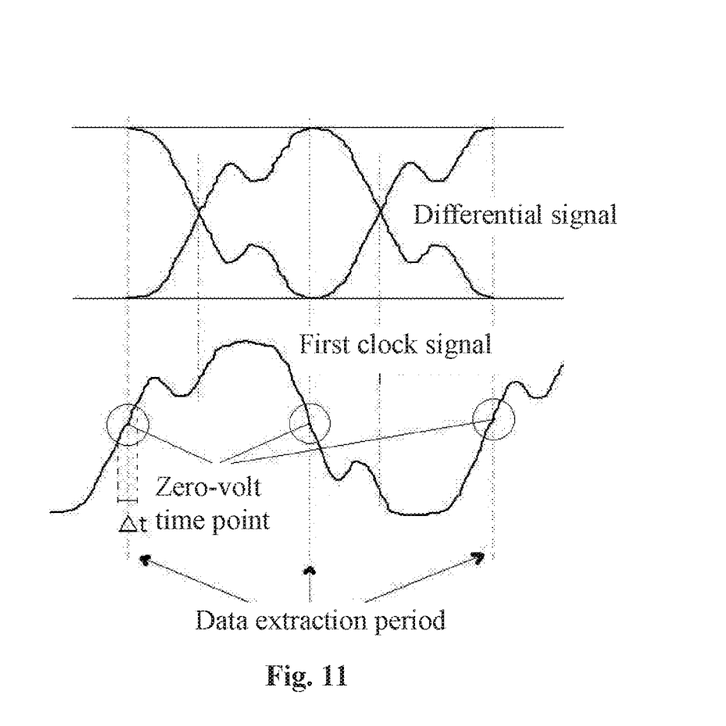
FIG. 11 is an example view of a still another embodiment of a data extraction method for transmission signal according to the present application.

In the present embodiment, in the digital circuit, since the rising edge is the moment when the level of the digital signal changes from a low level to a high level, and the falling edge is the moment when the level of the digital signal jumps from a high level to a low level, referring to FIG. 11, the method of extracting the data of the transmitted signal may also be: upon receiving a transmission signal, parsing the first clock signal to obtain a zero-volt time point of the first clock signal, then obtaining a predetermined duration, and generating a data extraction period centered at the zero-volt time point according to the zero-volt time point and the predetermined duration. Thus, the data extraction period may include a rising edge and/or a falling edge of the first clock signal. Then, extracting the data of the transmission signal according to the data extraction period may improve the accuracy of data extraction for the transmission signal.

Before the step of obtaining a predetermined duration, and generating a data extraction period centered at the zero-volt time point according to the zero-volt time point and the predetermined duration, the method further comprises: obtaining a rising edge and a falling edge of the first clock signal; obtaining a waveform outlier of the first clock signal according to the rising edge, the falling edge, and the zero-volt time point; determining the predetermined duration according to the waveform outlier.

Specifically, since the waveform of the first clock signal varies, the number of all rising and falling edges of the first clock signal may be greater than the number of rising and falling edges of the first clock signal whose waveforms are not varied in an ideal state. Since the number of zero-volt time points is approximately equal to the number of rising and falling edges of the first clock signal whose waveforms are not varied, a quantity value of all rising edges and falling edges of the first clock signal is obtained as a first quantity value; and a quantity value of the zero-volt time point as a second quantity value; the waveform outlier is obtained according to a difference between the first quantity value and the second quantity value. It should be noted that the predetermined duration may be inversely proportional to the waveform outlier. Therefore, the predetermined duration may be obtained by calculating a reciprocal of the waveform outlier.

In an embodiment, upon receiving a transmission signal, the first clock signal is parsed to obtain a zero-volt time point of the first clock signal; a predetermined duration is obtained to generate a data extraction period centered at the zero-volt time point according to the zero-volt time point and the predetermined duration; the data of the transmission signal is extracted according to the data extraction period. Thus, by extracting the data of the transmission signal according to the data extraction period centered at the zero-volt time point, the accuracy of data extraction for transmission signal is improved.

Figure 12:
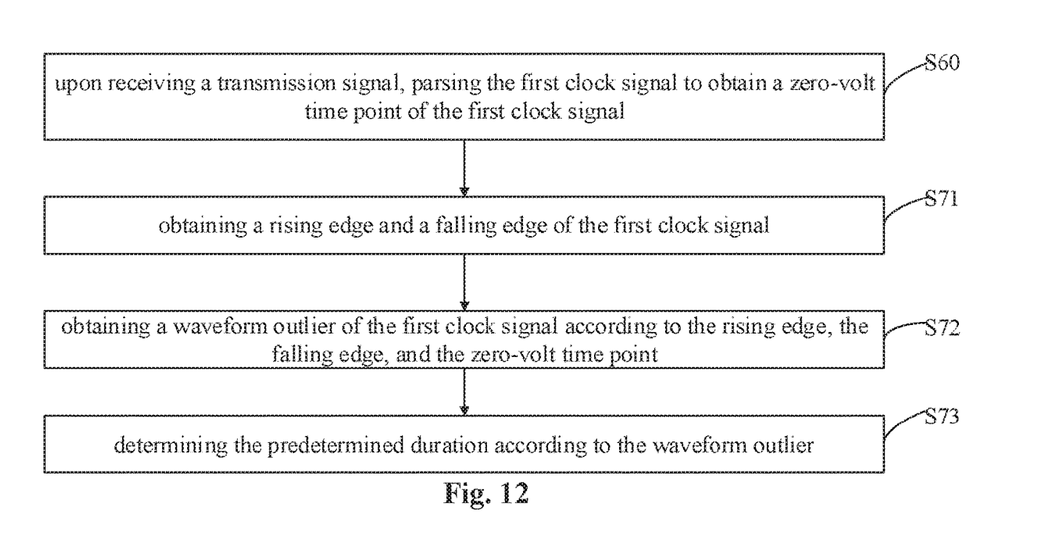
FIG. 12 is a flow chart of a still another embodiment of a data extraction method for transmission signal according to the present application.

In an embodiment, as shown in FIG. 12, based on the above embodiments of FIGS. 2 to 11, before the step of obtaining a predetermined duration, and generating a data extraction period centered at the zero-volt time point according to the zero-volt time point and the predetermined duration, the method further comprises:

step S71, obtaining a rising edge and a falling edge of the first clock signal.

step S72, obtaining a waveform outlier of the first clock signal according to the rising edge, the falling edge, and the zero-volt time point.

step S73, determining the predetermined duration according to the waveform outlier.

In the present embodiment, since the waveform of the first clock signal varies, the number of all rising and falling edges of the first clock signal may be greater than the number of rising and falling edges of the first clock signal whose waveforms are not varied in an ideal state. Since the number of zero-volt time points is approximately equal to the number of rising and falling edges of the first clock signal whose waveforms are not varied, a quantity value of all rising edges and falling edges of the first clock signal is obtained as a first quantity value; and a quantity value of the zero-volt time point as a second quantity value; the waveform outlier is obtained according to a difference between the first quantity value and the second quantity value. It should be noted that the predetermined duration may be inversely proportional to the waveform outlier. Therefore, the predetermined duration may be obtained by calculating a reciprocal of the waveform outlier.

In an embodiment, a rising edge and a falling edge of the first clock signal is obtained; a waveform outlier of the first clock signal is obtained according to the rising edge, the falling edge, and the zero-volt time point; the predetermined duration is determined according to the waveform outlier. Thus, determining the predetermined duration according to the waveform outlier of the first signal is implemented.

Figure 13:
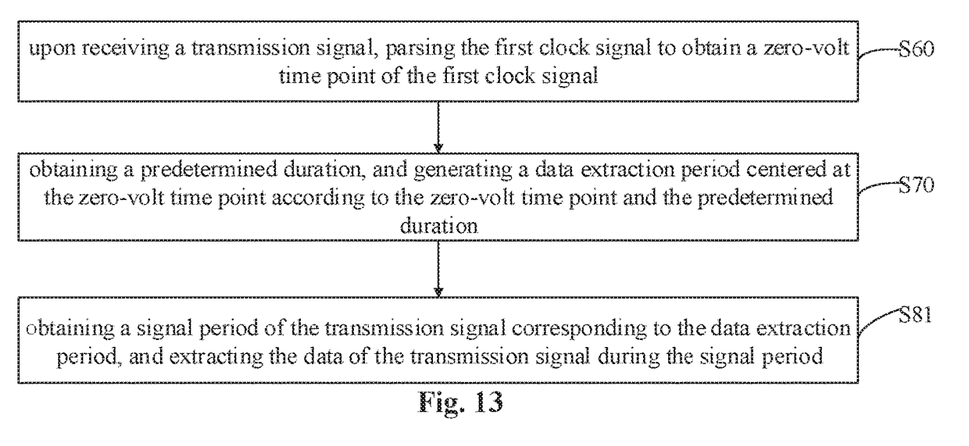
FIG. 13 is a flow chart of a still another embodiment of a data extraction method for transmission signal according to the present application.

In an embodiment, as shown in FIG. 13, based on the above embodiments of FIGS. 2 to 12, the step of extracting the data of the transmission signal according to the data extraction period includes:

step S81, obtaining a signal period of the transmission signal corresponding to the data extraction period, and extracting the data of the transmission signal during the signal period.

In the present embodiment, also, after the signal period of the transmission signal is obtained, the signal data memory is activated in the signal period, and the data of the transmission signal is stored in the signal period to extract the data of the transmission signal.

In an embodiment, a signal period of the transmission signal corresponding to the data extraction period is obtained, and the data of the transmission signal during the signal period is extracted. In this way, the extraction of the data of the transmission signal is implemented.

Further, the present application further provides a data extraction device for transmission signal, wherein the data extraction device for transmission signal comprises a memory, a processor, and a data extraction program for transmission signal stored in the memory and capable of running on the processor; the data extraction program of the transmission signal is implemented by the processor to implement the steps of the data extraction method for transmission signal as described in the above embodiments.

Moreover, the present application further provides a computer readable storage medium, wherein the computer readable storage medium comprises a data extraction program; the data extraction program for transmission signal is implemented by the processor to implement the steps of the data extraction method for transmission signal as described in the above embodiments.

The serial numbers of the embodiments of the present application are merely for the description, and do not represent the advantages and disadvantages of the embodiments.

Through the description of the above implementations, those skilled in the art can clearly understand that the foregoing embodiment method can be implemented by means of software plus a necessary general hardware platform, and of course, can also be implemented through hardware, but in many cases, the former is better. Based on the understanding, the technical solutions of the present application in essence may illustrate in the form of a software product, the computer software product is stored in a storage medium (such as ROM/RAM, disk, CD), including some instructions for making a terminal device (television, mobile phone, computer, server, air-conditioner or network device and the like) implement the methods in the embodiments of the present application.

The above is only the alternative embodiment of the present application, which does not limit the patent scope of the present disclosure, and any equivalent structure or process made by using the specification and the drawings of the present application or direct or indirect applications in other related technical fields should be contained in the scope of patent protection in a similar way.

What is claimed is:

1. A data extraction method for transmission signal comprising steps of:
   upon receiving a transmission signal, parsing a first clock signal corresponding to the transmission signal to obtain a signal frequency;
   generating a second clock signal of same frequency according to the signal frequency; and
   extracting data of the transmission signal according to the second clock signal;
   wherein the data extraction method for the transmission signal further comprises:
   upon receiving the transmission signal, parsing the first clock signal to obtain a zero-volt time point of the first clock signal;
   obtaining a predetermined duration, and generating a data extraction period centered at the zero-volt time point based on the zero-volt time point and the predetermined duration; and
   extracting the data of the transmission signal according to the data extraction period;
   wherein before the step of obtaining the predetermined duration, and generating the data extraction period centered at the zero-volt time point based on the zero-volt time point and the predetermined duration, the method further comprises:
   obtaining a rising edge and a falling edge of the first clock signal;
   obtaining a waveform outlier of the first clock signal according to the rising edge, the falling edge, and the zero-volt time point; and
   determining the predetermined duration according to the waveform outlier.

2. The data extraction method for transmission signal according to claim 1, wherein the step of parsing the first clock signal corresponding to the transmission signal to obtain a signal frequency comprises:
   parsing the first clock signal corresponding to the transmission signal to obtain a time interval between two adjacent zero-volt time points in the first clock signal; and
   calculating the signal frequency according to the time interval.

3. The data extraction method for transmission signal according to claim 2, wherein the step of calculating the signal frequency according to the time interval comprises:
   calculating a signal period of the first clock signal according to the time interval; and
   calculating the signal frequency according to the signal period.

4. The data extraction method for transmission signal according to claim 2, wherein before the step of calculating the signal frequency according to the time interval, the method further comprises:
   treating time intervals with equal durations as a same time interval, and accumulating a number of occurrences of the same time interval; and
   treating a time interval whose number of occurrences meets a predetermined condition as the time interval for calculating the signal frequency.

5. The data extraction method for transmission signal according to claim 2, wherein before the step of calculating the signal frequency according to the time interval, the method further comprises:
   obtaining all time intervals within a predetermined time, treating time intervals with equal durations as a same time interval, and accumulating a number of occurrences of the same time interval; and
   treating a time interval whose number of occurrences is the greatest as the time interval for calculating the signal frequency.

6. The data extraction method for transmission signal according to claim 1, wherein the step of generating a second clock signal of same frequency according to the signal frequency comprises:
   generating a second clock signal of same frequency as the first clock signal according to the signal frequency, a signal waveform of the second clock signal being not affected by noise.

7. The data extraction method for transmission signal according to claim 1, wherein the step of parsing a first clock signal corresponding to the transmission signal to obtain a signal frequency comprises:
   upon receiving the first clock signal, controlling a frequency determining member in a data driver to parse the first clock signal to obtain the signal frequency.

8. The data extraction method for transmission signal according to claim 1, wherein following the step of generating the second clock signal of the same frequency according to the signal frequency, the method further comprises:
controlling a clock signal generating member in a data driver to generate the second clock signal of the same frequency according to the signal frequency.

9. The data extraction method for transmission signal according to claim 1, wherein the step of extracting a data of the transmission signal according to the second clock signal comprises:
extracting the data of the transmission signal according to a rising edge or a falling edge of the second clock signal.

10. The data extraction method for transmission signal according to claim 9, wherein the step of extracting the data of the transmission signal according to the rising edge or the falling edge of the second clock signal comprises:
upon the second clock signal being at the rising edge or the falling edge, obtaining a time point of the transmission signal corresponding to the rising edge or the falling edge; and
extracting the data of the transmission signal according to the time point.

11. The data extraction method for transmission signal according to claim 1, wherein the step of obtaining a waveform outlier of the first clock signal according to the rising edge, the falling edge, and the zero-volt time point comprises:
obtaining a quantity value of all rising edges and falling edges of the first clock signal as a first quantity value;
obtaining a quantity value of all zero-volt time points of the first clock signal as a second quantity value; and
obtaining the waveform outlier according to a difference between the first quantity value and the second quantity value.

12. The data extraction method for transmission signal according to claim 1, wherein the step of extracting the data of the transmission signal according to the data extraction period comprises:
obtaining a signal period of the transmission signal corresponding to the data extraction period; and
extracting the data of the transmission signal during the signal period.

13. The data extraction method for transmission signal according to claim 12, wherein the step of extracting the data of the transmission signal during the signal period comprises:
activating a signal data memory during the signal period to extract the data of the transmission signal.

14. The data extraction method for transmission signal according to claim 1, wherein the data extraction method for transmission signal further comprises:
upon receiving a differential signal, parsing a first clock signal corresponding to the differential signal to obtain a signal frequency;
generating a second clock signal of same frequency according to the signal frequency; and
extracting data of the differential signal according to the second clock signal.

15. A data extraction device for transmission signal, wherein the data extraction device for transmission signal comprises a memory, a processor, and a data extraction program for transmission signal stored in the memory and the processor; the data extraction program for transmission signal is executable by the processor to implement the following steps of a data extraction method for transmission signal:

upon receiving a transmission signal, parsing a first clock signal corresponding to the transmission signal to obtain a signal frequency;
generating a second clock signal of same frequency according to the signal frequency; and
extracting a data of the transmission signal according to the second clock signal;
wherein the data extraction method for the transmission signal further comprises:
upon receiving the transmission signal, parsing the first clock signal to obtain a zero-volt time point of the first clock signal;
obtaining a predetermined duration, and generating a data extraction period centered at the zero-volt time point based on the zero-volt time point and the predetermined duration; and
extracting the data of the transmission signal according to the data extraction period;
wherein before the step of obtaining the predetermined duration, and generating the data extraction period centered at the zero-volt time point based on the zero-volt time point and the predetermined duration, the method further comprises:
obtaining a rising edge and a falling edge of the first clock signal;
obtaining a waveform outlier of the first clock signal according to the rising edge, the falling edge, and the zero-volt time point; and
determining the predetermined duration according to the waveform outlier.

16. A non-transitory computer readable storage medium, wherein the non-transitory computer readable storage medium is stored with a data extraction program; the data extraction program for transmission signal is executable by a processor to implement the following steps of a data extraction method for transmission signal:
upon receiving a transmission signal, parsing a first clock signal corresponding to the transmission signal to obtain a signal frequency;
generating a second clock signal of same frequency according to the signal frequency; and
extracting a data of the transmission signal according to the second clock signal;
wherein the data extraction method for the transmission signal further comprises:
upon receiving the transmission signal, parsing the first clock signal to obtain a zero-volt time point of the first clock signal;
obtaining a predetermined duration, and generating a data extraction period centered at the zero-volt time point based on the zero-volt time point and the predetermined duration; and
extracting the data of the transmission signal according to the data extraction period;
wherein before the step of obtaining the predetermined duration, and generating the data extraction period centered at the zero-volt time point based on the zero-volt time point and the predetermined duration, the method further comprises:
obtaining a rising edge and a falling edge of the first clock signal;
obtaining a waveform outlier of the first clock signal according to the rising edge, the falling edge, and the zero-volt time point; and determining the predetermined duration according to the waveform outlier.

* * * * *